United States Patent
Tanaka (10) Patent No.: US 8,899,532 B2
(45) Date of Patent: Dec. 2, 2014

(54) BAND CLIP

(75) Inventor: Hiroaki Tanaka, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 13/878,792

(22) PCT Filed: Mar. 28, 2011

(86) PCT No.: PCT/JP2011/057659
§ 371 (c)(1),
(2), (4) Date: Apr. 11, 2013

(87) PCT Pub. No.: WO2012/056747
PCT Pub. Date: May 3, 2012

(65) Prior Publication Data
US 2013/0193279 A1    Aug. 1, 2013

(30) Foreign Application Priority Data
Oct. 26, 2010   (JP) .................................. 2010-240046

(51) Int. Cl.
*F16L 3/08*    (2006.01)
*F16B 21/08*   (2006.01)
*F16L 3/137*   (2006.01)
*H02G 3/32*    (2006.01)

(52) U.S. Cl.
CPC ................ *F16L 3/137* (2013.01); *F16B 21/086* (2013.01); *H02G 3/32* (2013.01)
USPC ....... 248/74.3; 248/74.1; 248/74.2; 24/16 PB (58) Field of Classification Search
USPC ................ 248/74.3, 71, 74.1, 74.2; 24/16 PB
See application file for complete search history.

(56) References Cited

U.S. PATENT DOCUMENTS 4,455,715 A * 6/1984 Matsui .......................... 24/16 PB
4,708,306 A * 11/1987 Mitomi .......................... 248/74.3
(Continued)

FOREIGN PATENT DOCUMENTS

| JP | 57-83784 | 5/1982 |
| JP | 1-130585 | 9/1989 |

(Continued)

OTHER PUBLICATIONS

International Search Report of Jun. 7, 2011.

*Primary Examiner* — Terrell McKinnon
*Assistant Examiner* — Monica Millner
(74) *Attorney, Agent, or Firm* — Gerald E. Hespos; Michael J. Porco; Matthew T. Hespos (57) ABSTRACT

A band clip includes a body, a band integral with the body, and a clip that is attached to the body. The body has a vertical plate with a band insertion hole and a horizontal plate with a clip attachment hole. The band extends from the vertical plate. Locking holes penetrate the band at intervals. The clip includes a shaft that is fit into the clip attachment hole of the body, a wing on one end of the shaft, a band locking claw at another end of the shaft, and a body locking claw on an intermediate portion of the shaft. The band is wrapped around a group of wires and inserted into the band insertion hole. The band locking claw of the clip is inserted into and locked to a band locking hole, and the body locking claw contacts the surface of the body.

7 Claims, 5 Drawing Sheets

(56) References Cited

U.S. PATENT DOCUMENTS

| | | | | |
|---|---|---|---|---|
| 4,728,064 A * | 3/1988 | Caveney | | 248/74.3 |
| 4,766,651 A * | 8/1988 | Kobayashi et al. | | 24/16 PB |
| 4,944,683 A * | 7/1990 | Leonardo | | 439/96 |
| 5,131,613 A * | 7/1992 | Kamiya et al. | | 248/74.3 |
| 5,224,244 A * | 7/1993 | Ikeda et al. | | 24/16 PB |
| 5,402,970 A * | 4/1995 | Fujishita | | 248/74.3 |
| 5,632,457 A * | 5/1997 | Neely, Jr. | | 248/69 |
| 5,669,731 A * | 9/1997 | Hironaka et al. | | 403/397 |
| 5,921,510 A * | 7/1999 | Benoit et al. | | 248/71 |
| 6,464,181 B2 * | 10/2002 | Sakakura | | 248/68.1 |
| 6,655,644 B1 * | 12/2003 | Gretz | | 248/74.1 |
| 6,747,209 B2 * | 6/2004 | Uchida et al. | | 174/68.1 |
| 6,749,157 B2 * | 6/2004 | Takeuchi | | 248/71 |
| 7,229,052 B2 * | 6/2007 | Takeuchi | | 248/71 |
| 7,316,375 B2 * | 1/2008 | Wakabayashi et al. | | 248/71 |
| 7,594,629 B2 * | 9/2009 | Smutny et al. | | 248/71 |
| 7,661,633 B2 * | 2/2010 | Igarashi et al. | | 248/74.3 |
| 7,762,503 B2 * | 7/2010 | Franks | | 248/71 |
| 7,793,895 B2 * | 9/2010 | Franks | | 248/74.3 |
| 7,861,981 B2 * | 1/2011 | Olver | | 248/68.1 |
| 7,866,612 B2 * | 1/2011 | Doi et al. | | 248/71 |
| 8,282,047 B2 * | 10/2012 | Franks | | 248/71 |
| 8,286,924 B2 * | 10/2012 | Sano et al. | | 248/74.3 |
| 2003/0075647 A1 * | 4/2003 | Takenaga | | 248/71 |
| 2004/0046088 A1 * | 3/2004 | Uchida et al. | | 248/74.1 |
| 2004/0223805 A1 * | 11/2004 | Benedetti et al. | | 403/316 |
| 2005/0076478 A1 * | 4/2005 | Miyazaki et al. | | 24/16 PB |
| 2006/0016938 A1 * | 1/2006 | Wakabayashi et al. | | 248/71 |
| 2006/0130286 A1 * | 6/2006 | Igarashi et al. | | 24/17 A |
| 2007/0023586 A1 * | 2/2007 | Geiger | | 248/71 |
| 2007/0272807 A1 * | 11/2007 | Takagaki | | 248/71 |
| 2008/0093521 A1 * | 4/2008 | Doi et al. | | 248/231.9 |
| 2009/0235494 A1 * | 9/2009 | Browne et al. | | 24/16 R |
| 2010/0186197 A1 * | 7/2010 | Inomata et al. | | 24/16 R |

FOREIGN PATENT DOCUMENTS

| | | |
|---|---|---|
| JP | 2000-23335 | 1/2000 |
| JP | 2001-268757 | 9/2001 |
| JP | 2002-320317 | 10/2002 |
| JP | 2003-230218 | 8/2003 |

* cited by examiner

BAND CLIP

BACKGROUND

1. Field of the Invention

The present invention relates to a band clip, and specifically reduces the height of a body portion that binds and fixes a band that is wrapped around a group of electric wires of a wire harness.

2. Description of the Related Art

Figure 6:
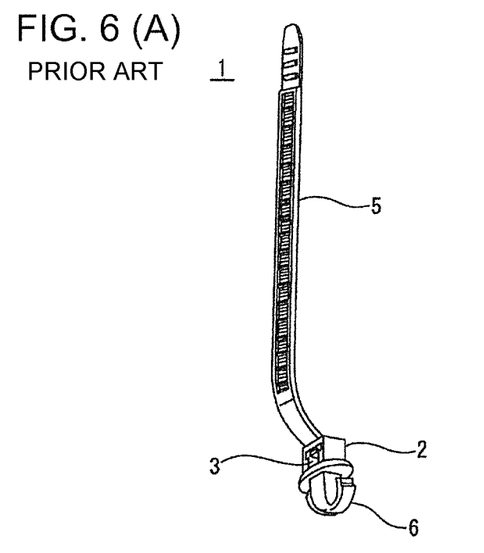
FIG. 6 is a diagram showing a conventional example.

Various shapes of resin-molded band clips have conventionally been used to bind groups of electric wires of wire harnesses that are arranged in automobiles and the like, and to fix the wire harnesses to a vehicle body. A conventional band clip 1 includes, as shown in FIGS. 6(A) to 6(C) for example, a box-shaped body 2 for the insertion and locking of a band 5 that is wrapped around a group of electric wires D of a wire harness, the band 5 that extends out from the body 2, and a clip 6 that protrudes out from the outer face of the body 2 and is inserted into and locked to a panel hole in a vehicle body panel. An insertion hole 3 for insertion of the band 5 is provided in the body 2, a tongue (elastic piece) 4 is provided as a protrusion inside the insertion hole 3, and the tongue 4 is provided with locking claws 4a for engaging with a sawtooth-shaped locked portion 5a provided on the surface of the band 5 when it is inserted (see JP 2002-320317A).

With the band clip 1 configured as described above, the group of electric wires D can be bound with the band 5 by wrapping the band 5 around the group of electric wires D and inserting it into and pulling it through the insertion hole 3 of the body 2 as shown in FIG. 6(B), and then engaging the locked portion 5a of the band 5 with the locking claws 4a of the tongue 4 at a band fastening position as shown in FIG. 6(C).

However, a height H of the box-shaped body 2 of the band clip 1 readily rises since the insertion hole 3 that includes the tongue 4 for lock binding needs to be provided between an upper wall 2a and a lower wall 2b that have a predetermined thickness. As the height H of the body 2 rises, the amount of space where the wire harness is arranged decreases, and there are cases where stability deteriorates due to a rise in the height of the barycentric position of the wire harness fixed to the vehicle body. In addition to the lower wall 2b out from which the clip 6 protrudes, the body 2 also needs to be provided with the upper wall 2a and side walls 2c for forming the insertion hole 3, and these walls 2a and 2c create the problem of an increase in weight and an increase in manufacturing cost.

A problem addressed by the present invention is the provision of a band clip that can reduce the height of the body for binding and fixing a band wrapped around a group of electric wires of a wire harness, and can suppress weight and manufacturing cost.

SUMMARY OF THE INVENTION

In order to solve the aforementioned problem, the present invention provides a band clip that includes: a body, a band molded integrally with the body so as to extend out therefrom, and a clip for vehicle body locking, the clip being movably attached to the body and protruding out from an outer face of the body, wherein the body is L-shaped due to bending of a vertical plate portion provided with a band insertion hole from one end of a horizontal plate portion provided with a clip attachment hole, the band extends out from a protruding end of the vertical plate portion, and locking holes are provided in the band at an interval in a length direction, the clip includes a shaft portion that is movably fitted into the clip attachment hole of the body, a wing portion for vehicle body locking that is provided on one end side of the shaft portion, a band locking claw provided as a protrusion on an outer circumferential face at another end of the shaft portion, and a body locking claw provided as a protrusion on an outer circumferential face in an intermediate portion of the shaft portion, and when the shaft portion is movably inserted into the clip attachment hole of the body and temporarily fixed due to the band locking claw of the clip locking with a rim of an opening at a leading end of the clip attachment hole, the band wrapped around a group of electric wires of a wire harness is inserted into the band insertion hole, and the clip is pushed, the band locking claw is inserted into and locked to a locking hole in the band, and the body locking claw comes into contact with a surface of the body at such position.

As described above, the band clip of the present invention has a body that is L-shaped due to bending of the vertical plate portion provided with the band insertion hole from one end of the horizontal plate portion provided with the clip attachment hole in the center. Also, when the shaft portion of the clip, which has a wing portion for vehicle body locking provided so as to protrude out on one end side, is movably fitted into the clip attachment hole in the horizontal plate portion, the band locking claw provided on the outer circumferential face on the other end of the shaft portion is inserted into and locked to a locking hole in the band, and the body locking claw provided on the outer circumferential face in the intermediate portion of the shaft portion comes into contact with the surface of the body when the band locking claw is inserted into and locked to the locking hole in the band.

Accordingly, when the band wrapped around the group of electric wires of the wire harness is fastened by being inserted into the band insertion hole of the vertical plate portion, and the clip attachment hole of the horizontal plate portion and the predetermined locking hole of the band are put into communication with each other, the band can be fixed if the clip, whose shaft portion has been movably fitted into the clip attachment hole, is merely pushed toward the band such that the band locking claw at the shaft portion tip is inserted into and locked to the locking hole in the band. At the same time, the body locking claw at the intermediate position on the shaft portion can be brought into contact with the surface of the body on the opposite side of the band. In this way, the shaft portion does not come out of the locking hole in the band or shift in the shaft front/rear direction due to the shaft portion of the clip being inserted into the locking hole of the band in a fastened state, and due to the shaft front/rear direction wedging of the band locking claw and the body locking claw on the shaft portion, thus maintaining firm binding of the band. Also, since the shaft portion is firmly fixed due to being inserted into and locked to the locking hole in the band, the wing portion on the lower end side of the shaft portion can also be reliably locked to the vehicle body in a stable manner. Accordingly, since there is no need to provide a relatively high upper wall and tall insertion hole internally provided with a protruding tongue for lock binding as in conventional technology, the height of the body can be kept low, there is an increase in the amount of space where the wire harness is arranged, and it is possible to raise the stability of the wire harness when it is fixed to the vehicle body. Weight and manufacturing cost can also be suppressed since there is no need for the upper wall and side walls that are required in the case of a box-shaped body.

Also, as described above, when the clip shaft portion is movably inserted into the clip attachment hole and temporarily fixed due to the band locking claw of the clip shaft portion locking with the rim of the opening at the leading end of the clip attachment hole, the band locking claw can be easily inserted into and locked to the locking hole in the band by merely pulling the band inserted into the band insertion hole with one hand and pushing the clip toward the band with the other hand, and thus the binding task can be performed efficiently. Also, temporarily fixing the clip enables preventing loss of the clip as well.

It is preferable that a dish portion that surrounds the clip attachment hole is provided so as to protrude out on the horizontal plate portion of the body. According to this configuration, the wing portion of the clip that protrudes out from the clip attachment hole can be locked to the panel hole while bringing the dish portion into close contact with the vehicle body panel, thus enabling more stable locking to the vehicle body.

It is preferable that two to four of the band locking claws and the body locking claws of the clip are provided at intervals in a circumferential direction on an outer circumference of the shaft portion, the band locking claws protrude out inclined rearward from a shaft portion tip, and the body locking claws protrude out inclined forward toward the band locking claws.

As described above, the band locking claws protrude out inclined rearward from the shaft portion tip, and thus the band locking claws can be bent inward and smoothly inserted into the band locking hole located forward of the band locking claws. Also, after the band locking claws elastically revert outward so as to be locked to the locking hole of the band, rearward movement of the shaft portion can be prevented by the band locking claws that spread out to the rear in a tapered shaped.

Also, since the body locking claws protrude out inclined forward as described above, the body locking claws that spread out to the front in a tapered shape reliably come into contact with the surface of the body on the opposite side of the band when the band locking claws are inserted into and locked to the locking hole in the band, and further forward movement of the shaft portion can be prevented since the body locking claws play the role of a stopper.

In other words, according to the above-described configuration, after the band locking claws at the shaft portion tip are inserted into and locked to the locking hole in the band, the shaft portion is effectively prevented from coming out of the locking hole in the band or shifting in the shaft front/rear direction, thus maintaining even firmer binding of the band.

As described above, with the band clip of the present invention, the body is L-shaped due to bending of a vertical plate portion provided with a band insertion hole from one end of a horizontal plate portion provided with a clip attachment hole in the center, and the shaft portion of the clip, which has a wing portion for vehicle body locking provided so as to protrude out on one end side, is movably fitted into the clip attachment hole in the horizontal plate portion. Furthermore, the band locking claws provided on the outer circumferential face at the other end of the shaft portion are inserted into and locked to a locking hole in the band, and the body locking claws provided on the outer circumferential face in the intermediate portion of the shaft portion come into contact with the surface of the body when the band locking claws are inserted into and locked to the locking hole in the band.

Accordingly, when the band wrapped around the group of electric wires of the wire harness is fastened by being inserted into the band insertion hole of the vertical plate portion, and the clip attachment hole of the horizontal plate portion and the predetermined locking hole of the band are put into communication with each other, the band can be fixed if the clip, whose shaft portion has been movably fitted into the clip attachment hole, is merely pushed toward the band such that the band locking claws at the shaft portion tip are inserted into and locked to the locking hole in the band. At the same time, the body locking claws at intermediate positions on the shaft portion can be brought into contact with the surface of the body on the opposite side of the band. In other words, the shaft portion does not come out of the locking hole in the band or shift in the front/rear direction due to the shaft portion of the clip being inserted into the locking hole of the band in a fastened state, and due to the shaft front/rear direction wedging of the band locking claws and the body locking claws on the shaft portion, thus maintaining firm binding of the band. Accordingly, since there is no need to provide a relatively high upper wall and tall insertion hole internally provided with a protruding tongue for lock binding as in conventional technology, the height of the body can be kept low, there is an increase in the amount of space where the wire harness is arranged, and it is possible to raise the stability of the wire harness when it is fixed to the vehicle body. Weight and manufacturing cost can also be suppressed since there is no need for the upper wall and side walls that are required in the case of a box-shaped body.

BRIEF DESCRIPTION OF DRAWINGS

FIG. 2(A) is a front view of a clip portion, and a FIG. 2(B) is a plan view of the clip portion.

FIG. 3(A) is a plan view of a state in which the clip is temporarily fixed in a clip attachment hole in a body, and FIG. 3(B) is a cross-sectional view along line A-A.

FIG. 4(A) is a cross-sectional view immediately before the clip is pushed upward, and FIG. 4(B) is a cross-sectional view in which the clip has been pushed upward such that band locking claws on a shaft portion are inserted into and locked to a locking hole in the band.

DETAILED DESCRIPTION OF THE PREFERRED EMBODIMENTS

Hereinafter, an embodiment of a band clip of the present invention will be described with reference to the drawings.

Figure 3:
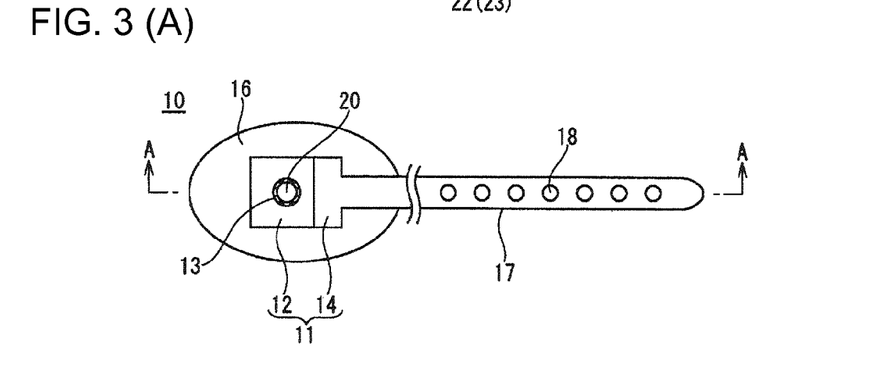
FIG. 3 shows the band clip according to the embodiment, where
Figure 4:
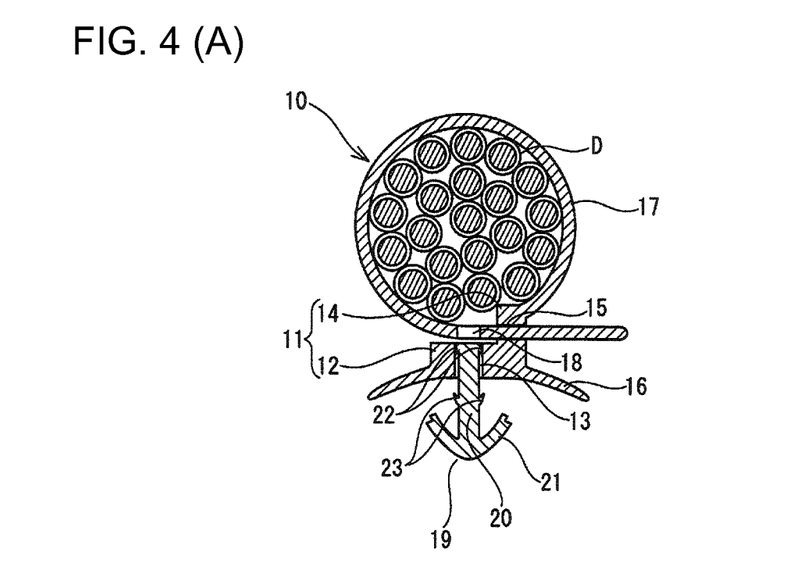
FIG. 4 shows a state in which a band wrapped around a group of electric wires of a wire harness has been inserted into a band insertion hole, where
Figure 5:
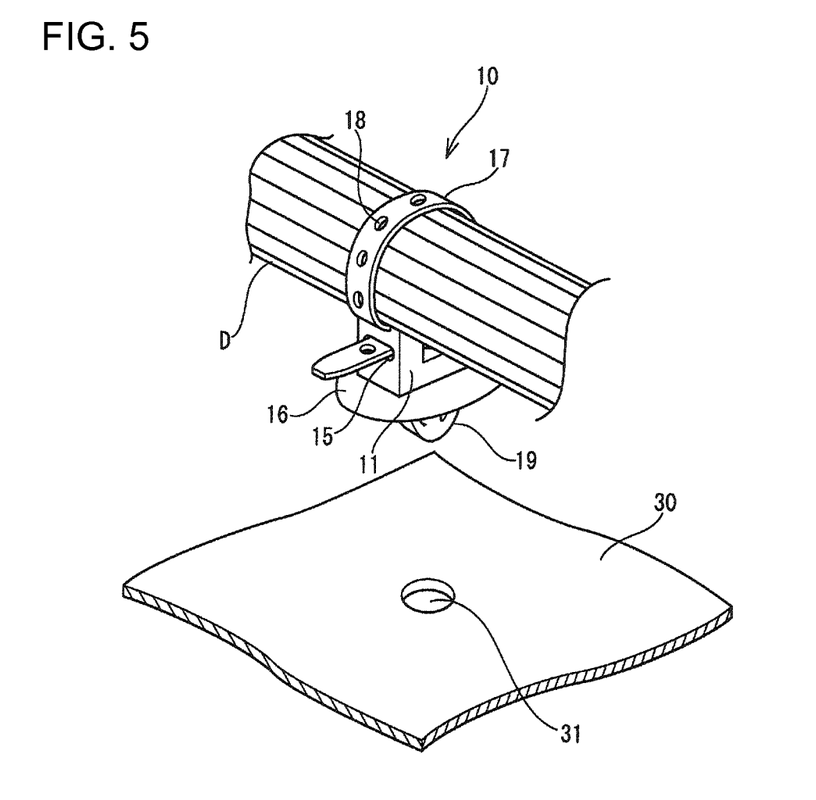
FIG. 5 is a schematic perspective view of a state in which a group of electric wires of a wire harness are bound by the band clip according to the embodiment.

FIGS. 1 to 5 show an embodiment of the present invention. As shown in FIG. 5, a band clip 10 of the present embodiment is for binding and fixing a band 17, which is wrapped around a group of electric wires D of a wire harness that is to be arranged in an automobile, at a position in a body 11, and for fixing the group of electric wires D of the wire harness to a vehicle body due to a clip 19, which protrudes out from a lower face of the body 11, being inserted into and locked to a panel hole 31 in a vehicle body panel 30. The band clip 10 is constituted by a resin-molded piece, and is configured from the body 11, the band 17, which is molded integrally with the body 11 so as to extend out therefrom, and the clip 19 for vehicle body locking, which is moveably attached to the body 11 and protrudes out from the lower face of the body 11.

Figure 1:
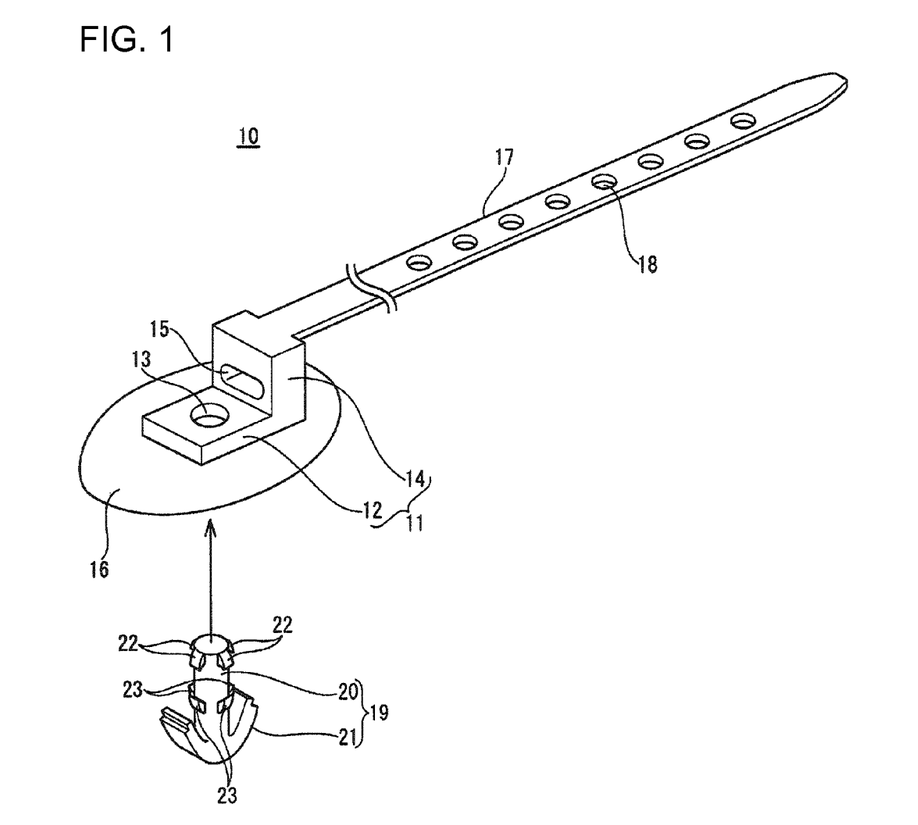
FIG. 1 is an exploded perspective view of a band clip according to an embodiment.

The body 11 is L-shaped due to the bending of a vertical plate portion 14 from one end of a horizontal plate portion 12. A clip attachment hole 13, into which a cylindrical shaft portion 20 of the clip 19 is movably fitted, is provided at the center of the horizontal plate portion 12, and an elliptical dish portion 16 that surrounds the clip attachment hole 13 is provided so as to protrude out on the lower face side of the horizontal plate portion 12. Also, a band insertion hole 15 for the insertion of the band 17 wrapped around the group of electric wires D is provided in the vertical plate portion 14, the belt-shaped band 17 for wrapping around the group of electric wires D of the wire harness extends from a protruding end of the vertical plate portion 14, and locking holes 18 that have approximately the same diameter as the clip attachment hole 13 are provided in the band 17 at intervals in the length direction.

Figure 2:
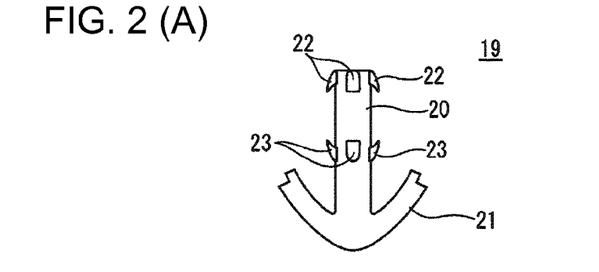

On the other hand, the clip 19 is molded as a separate body from the body 11, from which the integrally molded band 17 extends. A turned-down wing portion 21, which is inserted into and locked to the panel hole 31 in the vehicle body panel 30, is provided on the lower end side of the shaft portion 20 of the clip 19, which is movably fitted into the clip attachment hole 13 in the horizontal plate portion 12. Also, as shown in FIGS. 1 and 2, four band locking claws 22 are provided as protrusions inclined rearward from the tip of the shaft portion 20 at 90-degree intervals in the circumferential direction on the outer circumferential face of the upper end of the shaft portion 20, and four body locking claws 23 are provided as protrusions inclined forward from the rear of the shaft portion 20 at 90-degree intervals in the circumferential direction on the outer circumferential face in an intermediate portion of the shaft portion 20. In other words, when the band 17 wrapped around the group of electric wires D is fastened by being inserted into the band insertion hole 15 of the vertical plate portion 14, and then the clip 19 is pushed upward at a fastening position where a predetermined locking hole 18 in the band 17 is in communication with the upper face side of the clip attachment hole 13 in the horizontal plate portion 12, the band locking claws 22 at the tip of the clip shaft portion 20 are inserted into and locked to that locking hole 18 in the fastened band 17, and the body locking claws 23 at intermediate positions on the clip shaft portion 20 come into contact with the lower face of the body 11.

As shown in FIG. 3, according to the present embodiment, when the shaft portion 20 of the clip 19 is movably inserted into the clip attachment hole 13, the band locking claws 22 at the tip of the shaft portion 20 bend inward and then become locked with the rim of the opening at the leading end of the clip attachment hole 13, and thus the clip 19 is temporarily fixed in the clip attachment hole 13.

In order to bind the group of electric wires D with the band clip 10 of the present embodiment, firstly, the band 17 is wrapped around the outer periphery of the group of electric wires D, and then the band 17 is fastened by being inserted into the band insertion hole 15 in the vertical plate portion 14. At this fastened position, a predetermined locking hole 18 in the band 17, which is arranged on the upper face side of the clip attachment hole 13 in the horizontal plate portion 12, is in communication with the clip attachment hole 13 (FIG. 4(A)).

When the clip 19 is pushed upward in this state, the shaft portion 20, which had been temporarily fixed inside the clip attachment hole 13, is inserted into the locking hole 18 of the band 17, the band locking claws 22 at the shaft portion tip undergo elastic reversion so as to be locked with the upper end edge of the locking hole 18, and the body locking claws 23 at intermediate shaft portion positions come into contact with the lower face of the body 11 (FIG. 4(B)). In this way, the shaft portion 20 does not come out of or shift up/down in the locking hole 18 in the band 17 due to the shaft portion 20 of the clip 19 being inserted into the locking hole 18 of the band 17 in a fastened state, and due to the vertical wedging of the band locking claws 22 and the body locking claws 23 on the shaft portion 20, thus maintaining firm binding of the band 17.

Note that although multiple locking holes 18 are provided in the band 17 at intervals in the length direction as described above, FIG. 4 only shows the predetermined locking hole 18 into which and to which the band locking claws 22 are inserted and locked.

Accordingly, with the band clip 10 of the present embodiment, there is no need to provide a relatively high upper wall and tall insertion hole internally provided with a protruding tongue for lock binding as in conventional technology, and therefore the height of the body can be kept low. This increases the amount of space where the wire harness is arranged, and makes it possible to raise the stability of the wire harness when it is fixed to the vehicle body. Weight and manufacturing cost can also be suppressed since there is no need for the upper wall and side walls that are required in the case of a box-shaped body.

The invention claimed is:

1. A band clip for fixing a group of wires of a wire harness to a panel of a vehicle body through an opening formed in the panel, the band clip comprising:
    an L-shaped body having a vertical plate portion provided with a band insertion hole, the vertical plate portion extending at a substantially right angle from one end of a horizontal plate portion, the horizontal plate portion provided with a clip attachment hole and opposite top and bottom surfaces;
    a band molded integrally with the body and extending from a protruding end of the vertical plate portion, the band having a leading end spaced from the vertical plate portion, and at least one locking hole formed in the band between the vertical plate portion and the leading end; and
    a clip having a shaft portion with opposite first and second ends, a wing portion formed on the first end having at least first and second arms extending obliquely from the shaft and configured to be inserted into and locked to the opening in the panel of the vehicle body, at least one band locking claw provided on an outer circumferential face of the second end of the shaft portion, the at least one band locking claw having an outer surface inclined to project farther from the shaft at positions farther from the second end, and at least one body locking claw provided as a protrusion on an outer circumferential face in an intermediate portion of the shaft portion between the first and second ends, the at least one body locking claw having an outer surface to project farther from the shaft at positions farther from the first end, wherein
    the shaft portion is inserted into the clip attachment hole of the body and temporarily fixed at a first position where the at least one band locking claw of the clip engages the top surface of the horizontal plate portion,
    the band is wrapped around the group of electric wires of the wire harness and the leading end of the band is inserted into the band insertion hole, and
    the clip is moved to a second position in which the band locking claw is inserted into and locked to the locking hole in the band, and the body locking claw comes into contact with the bottom surface of the horizontal plate portion.

2. The band clip according to claim 1, wherein a dish portion that surrounds the clip attachment hole is provided so as to protrude out on the horizontal plate portion of the body.

3. The band clip according to claim 2, wherein the at least one band locking claw comprises a plurality of band locking claws and the at least one body locking claws comprises a plurality of body locking claws provided at intervals in a circumferential direction on the outer circumference of the shaft portion.

4. The band clip according to claim 1, wherein the at least one band locking claw comprises a plurality of band locking claws provided at intervals in a circumferential direction on the outer circumference of the shaft portion and the at least one body locking claw comprises a plurality of body locking claws provided at intervals in a circumferential direction on the outer circumference of the shaft portion.

5. A band clip for holding a group of electric wires to a vehicle body, comprising:
a band having opposite first and second ends and opposite top and bottom surfaces extending between the first and second ends, a clip attachment hole formed at the first end and at least one locking hole formed in the band between the first and second ends;
a shaft having opposite first and second ends;
a wing formed on the first end of the shaft and having at least one arm extending obliquely from the shaft and configured to be inserted into and locked to an opening in the vehicle body;
at least one band locking claw provided on an outer circumferential face of the second end of the shaft, the at least one band locking claw having an outer surface inclined to project farther from the shaft at positions farther from the second end; and
at least one body locking claw provided as a protrusion on an outer circumferential face in an intermediate portion of the shaft between the first and second ends, the at least one body locking claw having an outer surface to project farther from the shaft at positions farther from the first end, wherein
the shaft is inserted into the clip attachment hole of the band and temporarily fixed at a first position where the at least one band locking claw of the clip engages the clip attachment hole, and
the clip is moved to a second position in which the band locking claw is inserted into and locked to the locking hole in the band, and the body locking claw comes into contact with the bottom surface of the band near the clip attachment hole.

6. The clip according to claim 5, wherein the at least one band locking claw comprises a plurality of band locking claws and the at least one body locking claw comprises a plurality of body locking claws provided at intervals in a circumferential direction on the outer circumference of the shaft portion.

7. The clip according to claim 5, wherein the at least one band locking claw is resiliently deformable to bend inward when inserted into the clip attachment hole and expand outward to become locked to the clip attachment hole.

* * * * *